(12) United States Patent
Thiem et al.

(10) Patent No.: US 11,623,269 B2
(45) Date of Patent: Apr. 11, 2023

(54) DEVICE FOR COMPENSATING JOINING MOTIONS

(71) Applicant: EJOT GmbH & Co. KG, Bad Berleburg (DE)

(72) Inventors: Joerg Thiem, Zella-Mehlis (DE); Gerhard Dubiel, Tambach-Dietharz (DE); Sebastian Zebisch, Tambach-Dietharz (DE); Marco Mielisch, Erfurt (DE)

(73) Assignee: EJOT GMBH & CO. KG, Bad Berleburg (DE)

( * ) Notice: Subject to any disclaimer, the term of this patent is extended or adjusted under 35 U.S.C. 154(b) by 564 days.

(21) Appl. No.: 16/622,911

(22) PCT Filed: Jun. 12, 2018

(86) PCT No.: PCT/EP2018/065520
§ 371 (c)(1),
(2) Date: Dec. 16, 2019

(87) PCT Pub. No.: WO2018/229058
PCT Pub. Date: Dec. 20, 2018

(65) Prior Publication Data
US 2021/0146427 A1 May 20, 2021

(30) Foreign Application Priority Data
Jun. 14, 2017 (DE) .......................... 102017113097.7

(51) Int. Cl.
*B21J 15/28* (2006.01)
*B21J 15/02* (2006.01)
*B25J 11/00* (2006.01)

(52) U.S. Cl.
CPC ............. *B21J 15/025* (2013.01); *B21J 15/28* (2013.01); *B25J 11/007* (2013.01)

(58) Field of Classification Search
CPC . B21J 15/025; B21J 15/28; B21J 15/10; B25J 11/007; B25J 11/005
See application file for complete search history.

(56) References Cited

U.S. PATENT DOCUMENTS

| 4,637,776 A | * | 1/1987 | Saito | .................... B25J 9/1005 414/744.5 |
| 2005/0247166 A1 | * | 11/2005 | Sasaki | ................... B23P 19/06 81/54 |
| 2021/0213574 A1 | * | 7/2021 | Robbecke | ................ B25J 19/06 |

FOREIGN PATENT DOCUMENTS

| DE | 19905527 A1 | 8/2000 |
| DE | 10031073 A1 | 1/2002 |

(Continued)

OTHER PUBLICATIONS

Search Report for German Patent Application No. 102017113097.7 dated Jun. 14, 2017.

(Continued)

*Primary Examiner* — Ryan J. Walters
(74) *Attorney, Agent, or Firm* — Womble Bond Dickinson (US) LLP

(57) ABSTRACT

The invention relates to a joining unit (10, 40) for an articulated arm robot (12, 44) for joining a component (24, 58) with a joining element (28, 60) by applying an axial force. The joining unit (10, 40) comprises a base element (14, 42) for connecting to an articulated arm robot (12, 44). The base element (12, 42) is connected to an advancing unit (13, 46), which can be moved relative to the base element (14, 42) in an axial direction in and against a setting direction. The advancing unit (13, 46) is connected to a setting device (16, 54), which can be moved together with the advancing unit (13, 46). Furthermore, a pressure piece (26, 50) mounted for movement relative to the advancing unit (13, 46) in and against the setting direction is connected (Continued)

to the advancing unit (13, 46) by means of a coupling unit (17, 48). The invention is distinguished in that the coupling unit (17, 48) comprises a blocking unit (18, 56), which, starting from a predefined axial blocking position, prevents motion of the pressure piece (26, 50) relative to the advancing unit (13, 46) against the setting direction so long as the advancing force is less than the set blocking force. The blocking unit comprises a release device (20, 62), by means of which the relative motion of the pressure piece (26, 50) against the setting direction is enabled.

18 Claims, 4 Drawing Sheets

(56) References Cited

FOREIGN PATENT DOCUMENTS

| | | |
|---|---|---|
| DE | 102005031917 A1 | 4/2006 |
| DE | 102009034542 A1 | 1/2010 |
| DE | 102012215908 A1 | 5/2014 |
| DE | 102013208288 A1 | 11/2014 |
| DE | 102014015183 A1 | 4/2015 |
| DE | 102014117535 A1 | 6/2016 |
| DE | 102015207518 A1 | 11/2016 |
| DE | 102016005844 A1 | 12/2016 |
| JP | 60249519 A1 | 12/1985 |

OTHER PUBLICATIONS

International Search Report and Written Opinion for PCT/EP2018/065520.

* cited by examiner

DEVICE FOR COMPENSATING JOINING MOTIONS

This application is the national phase of International Application No. PCT/EP2018/065520, filed on Jun. 12, 2018, which claims priority to and the benefit of German Patent Application No. 102017113097.7, filed on Jun. 14, 2017, the disclosures of which are hereby incorporated by reference in their entireties.

The invention relates to a joining unit for an articulated arm robot for joining a component with a joining element by applying an axial force to the joining element.

A problem arising when an articulated arm robot is used for joining components is that—in particular in friction welding processes—the friction welding element will tilt under the action of the setting force, thus making it more difficult to set the fastener orthogonally with respect to the surface of the component.

Moreover, a rotary spindle providing the rotary drive will easily become disengaged from the drive structures of the friction welding element.

It is the object of the invention to provide a joining unit for an articulated arm robot that will allow a reliable setting of joining elements by means of axial thrust.

A joining unit for an articulated arm robot for joining a component or a component assembly on one side thereof with a joining element by means of axial thrust comprises a base element for connecting to an articulated arm robot, in particular a flange or any other connecting element. The base element is connected to an advancing unit which is moved in an axial direction relative to the base element, in and against the setting direction. The advancing unit carries a setting device which is moved together with the advancing unit. The setting device acts on the component via a joining element in order to connect the joining element with the component or the component assembly. In addition to the setting device, a pressure piece is connected to the advancing unit, which pressure piece also acts on the component. A coupling unit connects the pressure piece to the advancing unit. As the advancing unit moves towards the component, the pressure piece will be placed on the component.

The coupling unit is usually designed as a coil spring which supports the pressure piece with respect to the advancing unit. As the pressure piece makes contact with the component during placement, a spring force will thus be exerted on the component or the component assembly, which force can be used, for example, to fix an upper component layer to a lower component layer.

According to the invention, the coupling unit comprises a blocking unit which prevents relative axial movement in the direction of the advancing unit from a predefined axial blocking position onwards and can thus transmit the force exerted by the advancing unit to the component. The blocking unit is designed in such a way that it will prevent relative movement of the pressure piece before a blocking force set in the blocking unit is reached. If the blocking force is exceeded, movement can be permitted.

Furthermore, the blocking unit includes a release device which, when actuated, will reduce or completely remove the blocking force during the process.

To the extent in which the blocked force is reduced, this force can act on the component via the joining element, by means of the parallel acting setting device.

The release device will be activated as soon as the tip of the joining element makes contact with the component.

The release device preferably acts in such a way that the blocking force acting between the pressure piece and the advancing unit is abruptly reduced to zero. In particular, the blocking force will be constant during a pretensioning phase.

Applying the next process force to be transmitted to the articulated arm robot will prevent any additional relative movement between the articulated arm robot and the component. Consequently, the joining element will not tilt during the joining process, thus preventing any tilt-related adverse effects on the joining result.

According to a first embodiment, the blocking unit can comprise an electric motor which acts between the advancing unit and the pressure piece with the torque required for generating a blocking force and which can be switched off when the blocking force is reached, for example, thus allowing relative movement between the pressure piece and the advancing unit. Once the electric motor has been disconnected from the power supply, its internal resistance is considered to be negligible.

According to another embodiment, the blocking unit can comprise a pneumatic or hydraulic cylinder. In this embodiment, the piston of the cylinder can be supplied with the pressure necessary to set the desired blocking force. For this purpose, the piston will move to a stop in the cylinder, thus avoiding compression until the blocking force is reached.

In particular, the cylinder is designed as a pneumatic cylinder, thus enabling relative movement of the pressure piece owing to the compression of the air above a certain force that exceeds the preset blocking force. This is sufficient to bridge the distance between the pressure piece and the joining element on the setting device. As mentioned above, the release device is actuated once the joining element makes contact during placement, with the result that the force generated by the advancing unit acts on the joining element via the setting device.

In another advantageous embodiment, the blocking unit may be provided with a valve, in particular a control valve or a pressure relief valve that is connected to the cylinder. In this way, a defined pressure can be set which will allow the piston to move, even when incompressible media are used, once the force acting on the pressure piece exceeds the blocking force.

The release device may preferably include a bleed valve. The use of a bleed valve allows the blocking unit to be quickly and easily released.

The coupling unit may include a spring element, in particular a coil spring, which may be arranged so as to act in parallel to the blocking unit. In this way, a basic position of the pressure piece relative to the advancing unit can be set, especially if the axial travel of the pressure piece away from the advancing unit is limited by a stop. In this way, the spring force can be used to achieve initial contact by means of the pressure piece, which will then permit relative axial movement of the pressure piece in the direction of the advancing unit. Once the blocking position has been reached, the pressure piece will be prevented from moving any further.

Preferably, the joining unit is equipped with an initial placement contact detection means which detects the point in time when the joining element makes contact with the component during placement, whereupon the release device is actuated. Initial placement contact detection is particularly important when, after the blocking force has been exceeded, there is further relative movement between the setting device/advancing unit and the pressure piece.

Once the initial placement contact detection means detects initial placement contact of the joining element with the component, the release device can be actuated, thus causing the force of the advancing unit to be transmitted to the component exclusively via the setting device and the joining element. The setting device will be offset from the component only after the setting process has been completed.

Preferably, the initial placement contact detection means can include a force sensor which is connected to the setting device and detects the axial process force acting on the setting device. As the joining element is being placed on the component by the setting device, the force by which the blocking force is exceeded will be detected by the force sensor as the advancing unit continues to move, which reliably detects initial placement contact. The force sensor can be an axial force sensor comprising a strain gauge.

Placement contact detection can also be implemented by a displacement measuring system using a corresponding sensor, if necessary. It can also be implemented by the drive of the advancing unit, for example by means of an incremental displacement measuring system.

Alternatively, initial placement contact can also be detected based on the drive power of the advancing unit.

The setting device can comprise a rotary spindle which inserts a rotating joining element into a component or a component assembly.

The rotary spindle is operated in such a way that a speed of 3,000 to 10,000 revolutions per minute can be reached to produce a friction joint.

The pressure piece can preferably be designed as a pressure sleeve and arranged coaxially with respect to the setting device, in particular to the rotary spindle. This means that the setting device can be guided through the pressure piece, which allows the joining element to be guided and secured during the joining process.

In particular, the advancing unit is operated in such a way that the advancing force is kept constant during the pretensioning process and after actuation of the release device. This ensures that the tension in the system between the articulated arm robot and the component remains the same, which largely eliminates any offset during the joining process.

In particular, the advancing force is kept constant during the entire joining process. This has the advantage that the sum of the forces acting in the joining direction (e.g. process force, blocking force, etc.) will correspond exactly to the force pretensioning the articulated arm robot.

According to another aspect of the invention, the invention relates to a process for joining a component with a joining element using an articulated robot. The articulated robot is provided with an advancing unit for the axial insertion of a joining element into the component, which advancing unit comprises a setting device that can be fitted with a joining element and can be moved towards and into contact with the component with a pressure piece. The articulated arm robot now travels with the pressure piece blocked, thus placing the pressure piece together with the advancing unit on the component at the joining position, with the applied force resulting in a pretensioning of the articulated arm robot. Once the blocking force has been reached and the joining element rests on the surface of the component or component assembly, the release device is actuated. This thus switches off the blocking device and enables relative movement of the setting device with respect to the component.

As a result, after the blocking force has been released, the advancing unit acts exclusively on the component via the joining element placed thereon, and the joining element placed thereon is then inserted into the component using an advancing force equal to the blocking force used earlier on.

As a result, the force acting on the component will not change during the joining process, which thus prevents the setting device from being offset from the component before the joining process is completed. This ensures a reliable and accurate setting process.

Additional advantages, features and possible applications of this invention may be gathered from the description which follows, in which reference is made to the embodiments illustrated in the drawings. In the drawings, FIG. 1 is a view of a first process step of a schematically illustrated arrangement according to the invention;

Figure 1:
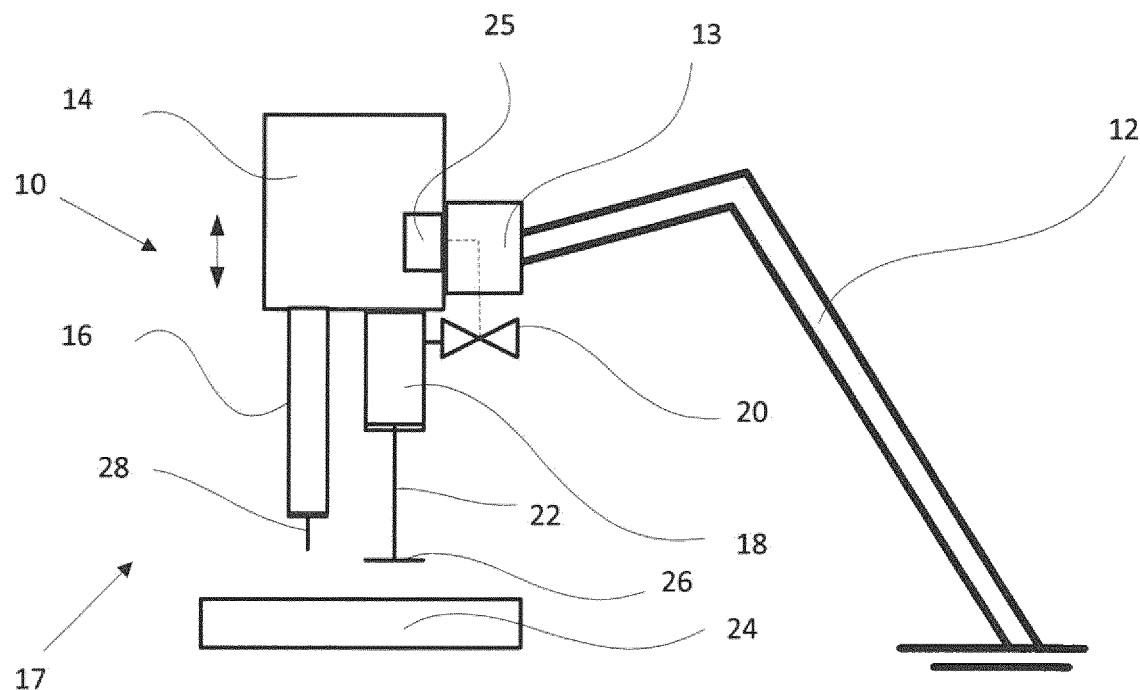

The view of FIG. 1 shows a joining unit 10 according to the invention which is attached to a schematically illustrated articulated arm robot 12. The joining unit 10 has a base element 13 to which an advancing unit 14 is attached. The advancing unit 14 can be moved in the axial direction relative to the base element 13. A setting device in the form of a rotary spindle 16 is connected to the advancing unit 14. Furthermore, a coupling unit 17 is provided which acts parallel to the rotary spindle 16 and which couples a pressure piece 26 to the advancing unit 14. The coupling unit 17 comprises a blocking unit in the form of a pneumatic cylinder 18 connected to the advancing unit 14. The pneumatic cylinder 18 is fitted with a bleed valve 20 which acts as a release device and can be used to reduce the pressure applied to the piston 22 of the cylinder 18. At the end of the piston 22 facing a component 24, a pressure piece 26 is arranged which can be used to transmit a pressing force to the component 24. In the present embodiment, the blocking position from which on any relative movement of the pressure piece 26 below the blocking force is prevented, is permanently set to the maximum extension length of the piston 22. The distance of the pressure piece 26 from the advancing unit 14 is slightly higher than the distance of the tip of the joining element 28, which is fixed to the rotary spindle 16, from the advancing unit 14. In the present case, the blocking force is set to 2 kN. The pressure in the pneumatic cylinder 18 is set so that up to an applied force of 2 kN, it can be assumed that the pneumatic cylinder will behave rigidly. When the blocking force is reached, the compression of the air in the cylinder can cause the pressure piece 26 to move relative to the advancing unit 14. In addition, an initial placement contact detection means 25 is connected to the advancing unit 14 and the bleed valve 20.

Figure 2:
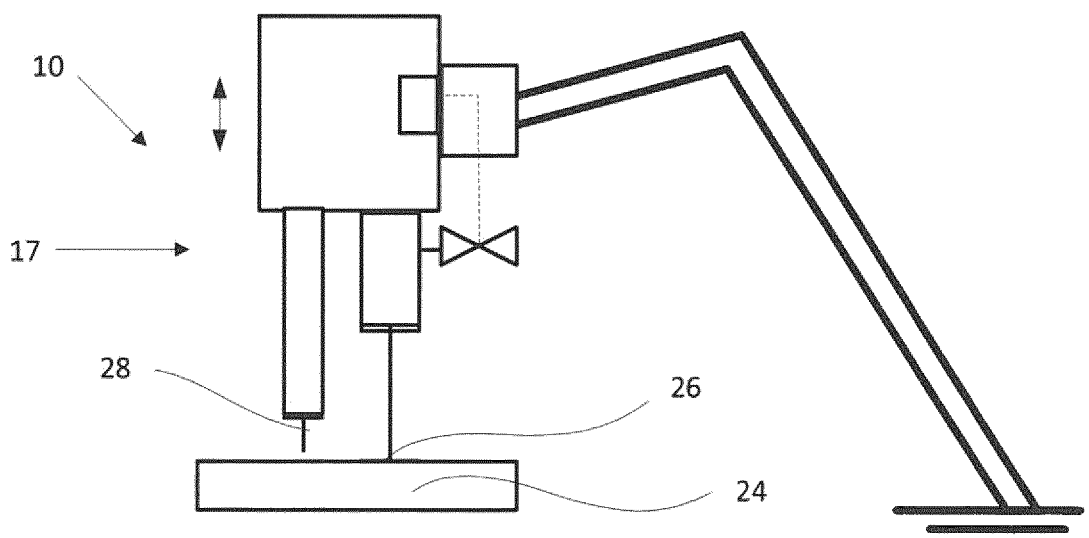
FIG. 2 is a view of a second process step of a schematically illustrated arrangement according to the invention.

As FIG. 2 further shows, this force is transmitted from the advancing unit 14 to the component 24. This pretensions the articulated arm robot 12, with the pressure piece 26 becoming offset with respect to the component 24 during this pretensioning process, depending on the angular positions of the articulated arm robot 12. In this way, pretension can be built up before the joining element 28 makes placement contact with the component 24.

Figure 3:
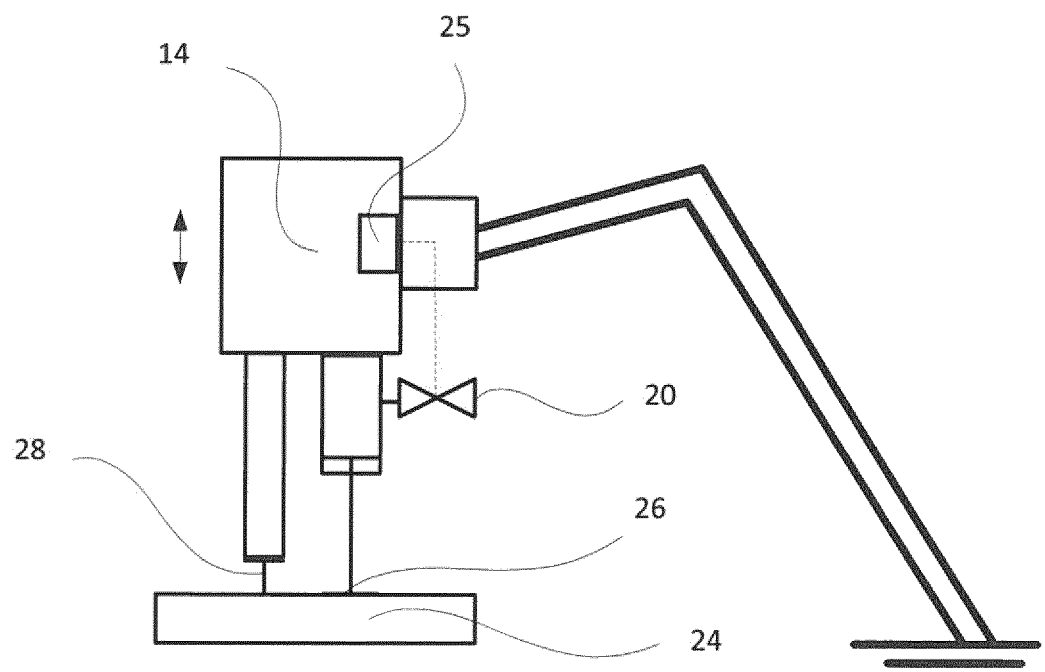
FIG. 3 is a view of a third process step of a schematically illustrated arrangement according to the invention.

The view of FIG. 3 shows another position in the setting process. In this phase of the joining process, the advancing unit 14 applies an advancing force that exceeds the blocking force of 2 kN. This compresses the fluid in the pressure chamber even though the connected bleed valve 20 is still closed. The compression of the fluid in the pressure chamber enables the pressure piece 26 to move relative to the advancing unit 14 until the tip of the joining element 28 comes to rest on the component 24. This is the time when the release device in the form of the bleed valve 20 will then be actuated.

Figure 4:
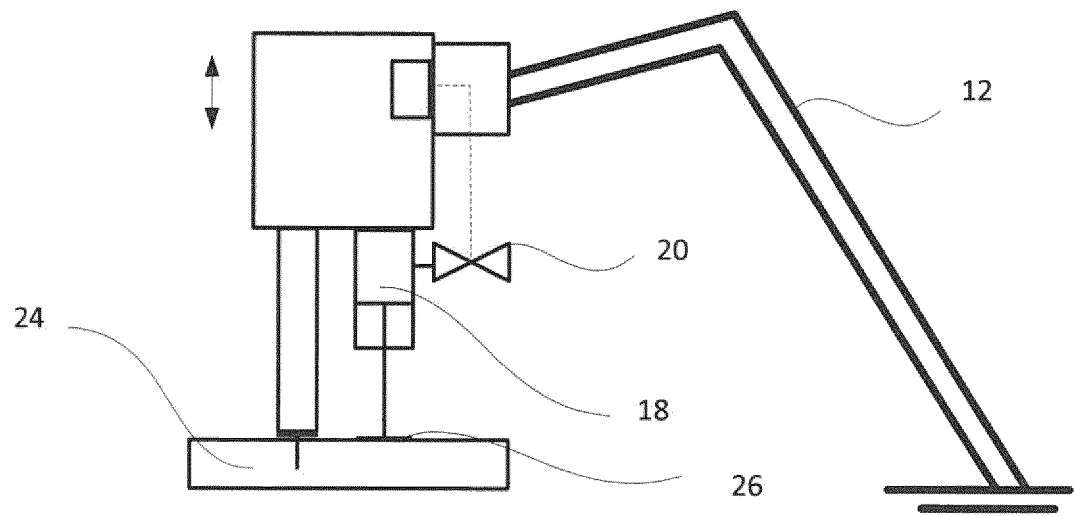
FIG. 4 is a view of a fourth process step of a schematically illustrated arrangement according to the invention.

The view of FIG. 4 shows the state occurring after opening the bleed valve 20. Opening the bleed valve 20 will cause the pressure chamber of the pneumatic cylinder 18 to be vented, with the result that no force can be transmitted between the component 24 and the articulated arm robot 12 via the pressure piece 26. As a consequence, the force is transmitted exclusively via the joining element 28 which is pressed onto the component 24 via the rotary spindle 16. This results in the joining element 28 being driven into the component 24 with an advancing force equal to the blocking force. Since there is an unchanged force ratio between the articulated arm robot 12 and the component 24, the process of setting the joining element 28 can be carried out without any offset during the joining process.

Figure 5:
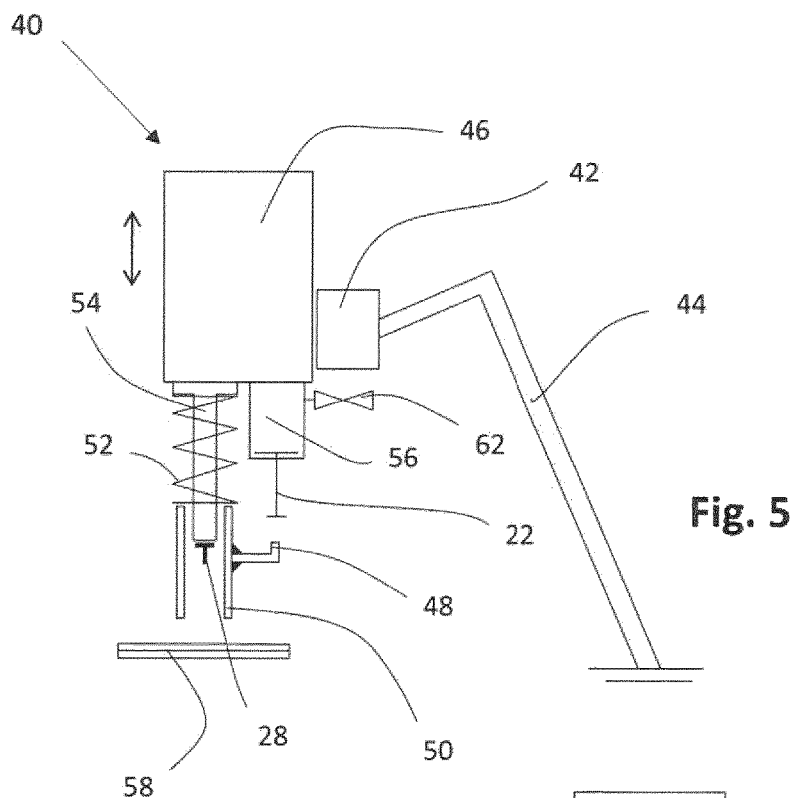
FIG. 5 is a view of a first process step of another embodiment, according to the invention, of a schematically illustrated arrangement.

FIG. 5 is a schematic view of another embodiment of a joining unit 40 according to the invention. The joining unit 40 comprises a base element 42 which is fixed to an articulated arm robot 44. As described with reference to the figures above, the joining unit 40 comprises an advancing unit 46 which can be moved in the axial setting direction. Furthermore, a coupling device 48 is provided which connects a hollow cylindrical pressure piece 50 with the advancing unit 46. The coupling device 48 comprises a coil spring 52 that is arranged coaxially relative to the hollow cylindrical pressure piece 50 and to a rotary spindle 54 guided by the pressure piece 50. In addition, the coupling device 48 has a blocking unit which takes the form of a pneumatic cylinder 56. Similar to the embodiment illustrated in FIGS. 1 to 4, an initial placement contact detection means can also be integrated into the joining unit.

Contrary to the embodiment illustrated in FIGS. 1 to 4, the blocking position of the pressure piece 50 is not reached immediately when it is placed on the component or component assembly 58.

Figure 6:
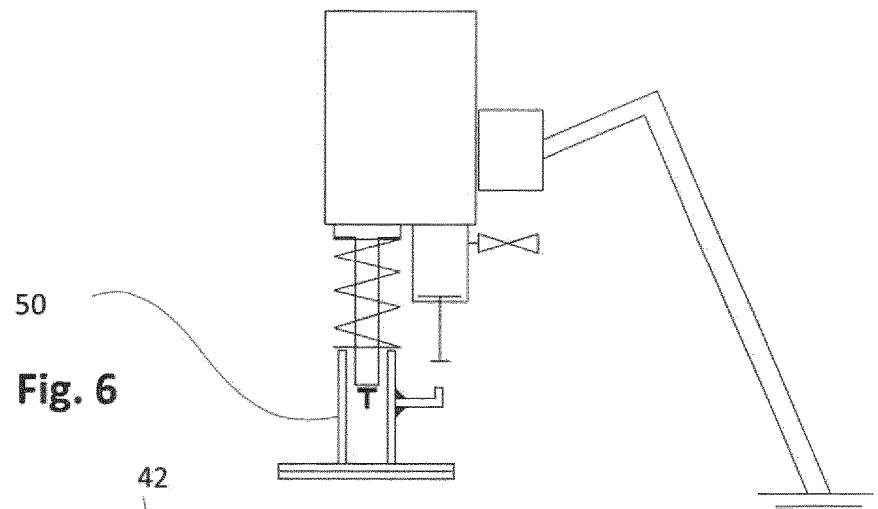
FIG. 6 is a view of a state after the first process step of the embodiment according to the invention.

As shown in FIG. 5, the advancing unit 46 is moved towards the component assembly 58 in a first step until the pressure piece 50 makes contact with the component assembly 58. This position is shown in FIG. 6.

Figure 7:
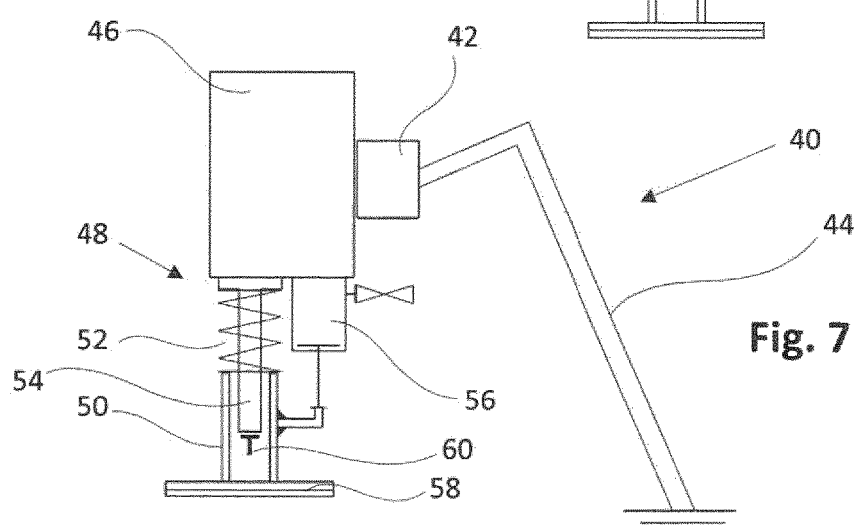
FIG. 7 is a view of a second process step of another embodiment, according to the invention, of a schematically illustrated arrangement.
Figure 8:
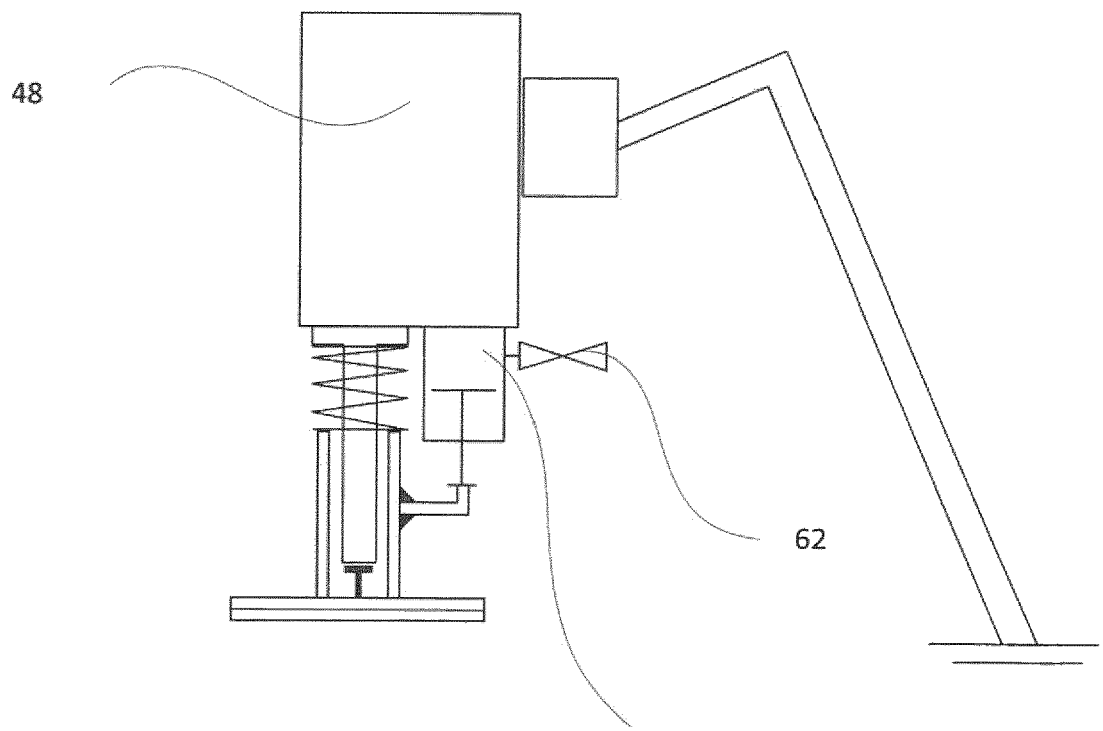
FIG. 8 is a view of a state after the second process step of the embodiment according to the invention.

As shown in FIG. 7, in a second step once the pressure piece 50 has been placed on the component assembly 58, the advancing action of the advancing unit 46 causes the coil spring 52 to be compressed with respect to the component assembly 58 until the pneumatic cylinder 56 blocks any further relative movement of the pressure piece 50 in the direction of the advancing unit 46. Up to this position, only the spring force of the spring 52 acts on the pressure piece 50. Once the pressure piece has reached the blocking position and the pneumatic cylinder 56 exerts it preset blocking force, this force can be transmitted to the component assembly 58. Now, if the advancing unit acts with a force that is only slightly higher than the blocking force, this will cause the air volume in the cylinder 56 to be compressed further in a closed state of the bleed valve 62, until the joining element 60 comes to sit on the component assembly, as shown in FIG. 8.

The joining element 60 held in the rotary spindle 54 has its tip still above the component 58. The joining process is identical to the process described with reference to FIGS. 1 to 4. When the joining element makes contact during placement, which is detected by a force measuring device integrated in the advancing unit 46, a release device is actuated, which is designed as a bleed valve 62 in the present embodiment and which is vented to achieve release. This ensures complete and fast venting of the pneumatic cylinder 56, and the joining element 60 is driven into the component assembly 58 by rotating it and applying an axial force that roughly corresponds to the predefined blocking force, and in the present case connects the two component layers of the component assembly 58 with each other.

Figure 9:
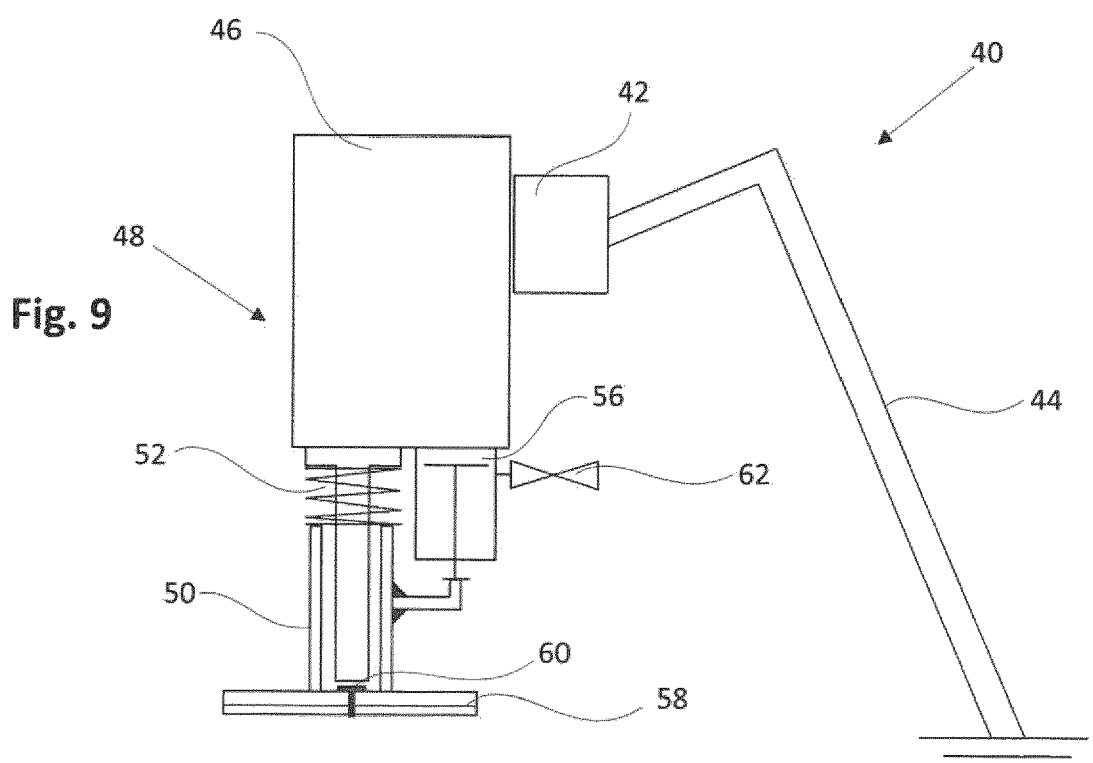
FIG. 9 is a view of a final state of the joining process of another embodiment, according to the invention, of a schematically illustrated arrangement.

The view of FIG. 9 shows this final state with the cylinder 62 vented, in which the joining element 60 connects the two component layers of the component assembly 58.

The invention claimed is:

1. Joining unit (10, 40) for an articulated arm robot (12, 44) for joining a component (24, 58) with a joining element (28, 60) by applying an axial force, with the joining unit (10, 40) comprising:
   a base element (14, 42) for connecting to an articulated arm robot (12, 44),
   an advancing unit (13, 46) connected to and movable relative to the base element (14, 42) in an axial direction in and against a setting direction,
   a setting device (16, 54) connected to and movable together with the advancing unit (13, 46), wherein the setting device comprises a rotary spindle (16, 54),
   a coupling unit connected to the advancing unit,
   a pressure piece (26, 50) mounted for movement relative to the advancing unit (13, 46) in and against the setting direction and being furthermore connected to the advancing unit (13, 46) by means of the coupling unit (17, 48),
   wherein the coupling unit (17, 48) comprises a blocking unit (18, 56) which, starting from a predefined axial blocking position, prevents movement of the pressure piece (26, 50) relative to the advancing unit (13, 46) against the setting direction so long as an advancing force of the advancing unit is less than a set blocking force, which blocking unit comprises a release device (20, 62) by means of which the relative movement of the pressure piece (26, 50) against the setting direction is enabled, wherein the blocking unit (18, 56) comprises a pneumatic cylinder or a hydraulic cylinder.

2. Joining unit according to claim 1, wherein the blocking unit (18, 56) is designed such that the blocking force is constant.

3. Joining unit according to claim 1, wherein the blocking unit (18, 56) comprises one of: a valve, a control valve or a pressure relief valve, which is connected to the cylinder.

4. Joining unit according to claim 1, wherein the release device comprises a bleed valve (20, 62).

5. Joining unit according to claim 1, wherein the blocking unit (18, 56) comprises an electric motor.

6. Joining unit according to claim 1, wherein the blocking unit (18, 56) acts directly on the pressure piece (26, 50).

7. Joining unit according to claim 1, wherein the blocking unit (18, 56) comprises a contact element which acts on the component (24, 58) to be joined.

8. Joining unit according to claim 1, wherein the coupling unit (48) comprises a spring (52) which sets a base position of the pressure piece (50) relative to the advancing unit (46).

9. Joining unit according to claim 1, wherein after actuation of the release device (20, 62), the advancing force acts on the joining element via the setting device (16, 54).

10. Joining unit according to claim 1, wherein a placement contact detection means (25) is connected to the advancing unit (13) which detects the point in time when the joining element makes placement contact with the component (28), whereupon the release device (20) is actuated.

11. Joining unit according to claim 10, wherein the placement contact detection means (25) comprises a force sensor which is connected to the setting device (16, 54) and detects the axial process force acting on the setting device (16, 54).

12. Joining unit according to claim 10, wherein the placement contact detection means (25) operates via motion of the advancing unit (13).

13. Joining unit according to claim 1, wherein the rotary spindle is capable of producing a speed of between 3,000 and 10,000 revolutions per minute to produce one or a combination of: a force-locking, a positive-locking or a material-locking connection.

14. Joining unit according to claim 1, wherein the setting device is guided through the pressure piece (26, 50), the pressure piece (26, 50) being of a hollow-cylindrical design.

15. Joining unit according to claim 1, wherein the advancing force is maintained constant during the pretensioning operation and after actuation of the release device (20, 62).

16. An apparatus for joining a component (24, 58) with a joining element (28, 60) using an articulated robot, comprising:
- an advancing unit (13, 46) being provided on the articulated robot and being axially movable,
- a joining element (28, 60) coupled to the advancing unit and brought into contact with the component (24, 58) by axial movement of the advancing unit,
- a setting device (16, 54) which can be fitted with the joining element (28, 60) and is movable toward the component (24, 58), wherein the setting device comprises a rotary spindle (16, 54),
- a blocking device limiting the movement of the setting device (16, 54) relative to the component (24, 58) by means of a pressure piece (26, 50), so long as an advancing force applied to the setting device is less than a preset blocking force, wherein the blocking device is released once the joining element (28, 60) makes contact with the component, causing the advancing force equivalent to the blocking force to be transmitted via the setting device (16, 54) and the joining element (28, 60) and thus to the component (24, 58), wherein the blocking device comprises a pneumatic cylinder (18, 56) or a hydraulic cylinder.

17. Apparatus according to claim 16, wherein the advancing force equivalent to the blocking force continues to act until the joining operation has been completed.

18. Apparatus according to claim 16, wherein the advancing force is kept constant over the entire joining process.

* * * * *